US010754352B1

(12) United States Patent
Kitts et al.

(10) Patent No.: US 10,754,352 B1
(45) Date of Patent: *Aug. 25, 2020

(54) MULTI-ROBOT GRADIENT BASED ADAPTIVE NAVIGATION SYSTEM

(71) Applicant: Santa Clara University, Santa Clara, CA (US)

(72) Inventors: Christopher A. Kitts, Burlingame, CA (US); Thomas Adamek, Sunnyvale, CA (US); Ignacio Mas, Buenos Aires (AR); Michael Neumann, Oakland, CA (US); Robert McDonald, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/951,829

(22) Filed: Apr. 12, 2018

Related U.S. Application Data

(63) Continuation-in-part of application No. 14/749,944, filed on Jun. 25, 2015, now Pat. No. 10,363,656.

(60) Provisional application No. 62/016,845, filed on Jun. 25, 2014, provisional application No. 62/485,802, filed on Apr. 14, 2017.

(51) Int. Cl.
    *G05D 1/00* (2006.01)
    *G05D 1/02* (2020.01)
    *G01C 21/00* (2006.01)

(52) U.S. Cl.
    CPC ......... *G05D 1/0287* (2013.01); *G01C 21/005* (2013.01); *G05D 1/0088* (2013.01); *G05D 1/0219* (2013.01); *G05D 2201/0207* (2013.01)

(58) Field of Classification Search
    USPC .................................................. 700/245–264
    See application file for complete search history.

(56) References Cited

U.S. PATENT DOCUMENTS

| | | | | |
|---|---|---|---|---|
| 3,764,964 A * | 10/1973 | Seeley, Jr. | ............... | G01S 3/808 367/117 |
| 6,266,577 B1 * | 7/2001 | Popp | ........................ | B25J 9/163 700/245 |
| 6,374,155 B1 * | 4/2002 | Wallach | ............... | G05D 1/0274 700/245 |
| 6,636,781 B1 * | 10/2003 | Shen | ....................... | B08B 9/045 318/568.11 |
| 7,966,093 B2 * | 6/2011 | Zhuk | .................... | G05D 1/0088 700/245 |
| 8,577,538 B2 * | 11/2013 | Lenser | ................. | G05D 1/0274 701/2 |
| 8,632,376 B2 * | 1/2014 | Dooley | ................... | A63F 9/143 463/63 |
| 8,809,755 B1 * | 8/2014 | Patel | ....................... | F42B 19/06 244/3.26 |
| 8,838,292 B2 * | 9/2014 | Palm | .................... | G05D 1/0289 701/2 |
| 8,996,224 B1 * | 3/2015 | Herbach | ............. | G05D 1/0011 701/23 |
| 9,043,069 B1 * | 5/2015 | Ferguson | .............. | B60W 30/00 701/23 |
| 9,261,578 B2 * | 2/2016 | Im | ........................ | G01S 5/0252 |
| 9,315,248 B2 * | 4/2016 | Williams | ............... | B63B 73/00 |
| 2004/0030449 A1 * | 2/2004 | Solomon | ........... | H04B 7/18517 700/245 |
| 2004/0162638 A1 * | 8/2004 | Solomon | ................. | F41H 13/00 700/247 |

(Continued)

*Primary Examiner* — Jonathan L Sample

(57) ABSTRACT

Systems and methods for multi-robot gradient-based adaptive navigation are provided.

1 Claim, 2 Drawing Sheets

(56) References Cited

U.S. PATENT DOCUMENTS

| | | | | |
|---|---|---|---|---|
| 2006/0015215 A1* | 1/2006 | Howard | ............... | G05D 1/0088 700/245 |
| 2006/0256652 A1* | 11/2006 | Thomas | ............... | G01V 1/3808 367/15 |
| 2007/0156286 A1* | 7/2007 | Yamauchi | ........... | G05D 1/0251 700/245 |
| 2007/0168117 A1* | 7/2007 | Howard | ................... | F41G 3/04 701/425 |
| 2007/0233337 A1* | 10/2007 | Plishner | .............. | G05D 1/0295 701/23 |
| 2008/0027591 A1* | 1/2008 | Lenser | ................ | G05D 1/0251 701/2 |
| 2009/0000860 A1* | 1/2009 | Plunkett | .............. | G10K 11/168 181/200 |
| 2009/0031940 A1* | 2/2009 | Stone | ...................... | G01S 15/93 114/330 |
| 2009/0292393 A1* | 11/2009 | Casey | ................. | G05D 1/0255 700/245 |
| 2012/0113756 A1* | 5/2012 | Carcaterra | .......... | G01V 1/3843 367/144 |
| 2012/0281503 A1* | 11/2012 | Rikoski | ............... | G01S 7/52003 367/88 |
| 2013/0083623 A1* | 4/2013 | Brizard | ................... | B63C 11/42 367/15 |
| 2013/0083624 A1* | 4/2013 | Brizard | ................... | B63G 8/08 367/15 |
| 2014/0107865 A1* | 4/2014 | Griffith, Sr. | ............. | G06F 17/00 701/2 |
| 2014/0177387 A1* | 6/2014 | Brizard | ................ | G01V 1/3808 367/15 |
| 2014/0301161 A1* | 10/2014 | Brizard | ................ | G01V 1/3835 367/15 |
| 2014/0365258 A1* | 12/2014 | Vestal | ........... | G06Q 10/063114 705/7.15 |
| 2015/0202770 A1* | 7/2015 | Patron | .................... | G05D 1/024 700/245 |
| 2015/0276959 A1* | 10/2015 | Grimsdale | ........... | G01V 1/3808 701/21 |
| 2015/0331421 A1* | 11/2015 | Brunet | .................... | G05D 1/10 701/23 |
| 2016/0353238 A1* | 12/2016 | Gherardi | ................ | H04B 1/69 |

\* cited by examiner

MULTI-ROBOT GRADIENT BASED ADAPTIVE NAVIGATION SYSTEM

CROSS-REFERENCE TO RELATED APPLICATIONS

This application claims priority from U.S. Provisional Patent Application 62/485,802 filed Apr. 14, 2017, which is incorporated herein by reference. This application is a continuation-in-part of U.S. patent application Ser. No. 14/749,944 filed Jun. 25, 2015, which is incorporated herein by reference. U.S. patent application Ser. No. 14/749,944 filed Jun. 25, 2015 claims priority from U.S. Provisional Patent Application 62/016,845 filed Jun. 25, 2014, which is incorporated herein by reference.

STATEMENT OF GOVERNMENT SPONSORED SUPPORT

This invention was made with Government support under contract CNS-0619940 awarded by the National Science Foundation. The Government has certain rights in the invention.

FIELD OF THE INVENTION

This invention relates to multi-robot gradient-based adaptive navigation system.

BACKGROUND OF THE INVENTION

Multi-robot systems have the potential to dramatically impact robotic applications through improved performance and the enabling of completely new capabilities. Alone, robots offer strength, speed, precision, repeatability, and the ability to withstand extreme environments. Combined in a multi-robot system, additional advantages are possible, such as redundancy, increased throughput, expanded coverage/availability, and spatially-distributed sensing and actuation. Multi-robot systems can support applications ranging from remote and in situ sensing to the physical manipulation of objects, and the domains for such applications include land, sea, air, and space. The present invention advances the navigation for such multi-robot systems.

SUMMARY OF THE INVENTION

The present invention provides a method and system with:
a) multiple, spatially distributed mobile robots,
b) a sensor package on each robot,
c) a robot formation (spatial) control system to ensure appropriate spatial distribution of the synchronized sensor measurements,
d) "primitive" adaptive navigation controllers that allow the robot cluster to efficiently navigate to/along locations of interest within a scalar parameter field, and
e) a state-based application-specific sequencer that invokes different adaptive navigation primitives to perform complex applications. A scalar field is one which associates a scalar value to every point in space; scalar values include quantities such as temperature, concentration level, signal levels, etc.

Conventional approaches generally involve navigating throughout an entire region of interest, taking samples of the quantity of interest while moving through this region, and then plotting/mapping this global collection of data to locate features of interest, such as local maxima/minima, etc. With the system of this invention, the group of robots is able to efficiently navigate to these locations (and/or to perform applications based on navigation with respect to those locations) without necessarily having to move throughout the entire region of interest. This can save a significant amount of time and energy in order to locate features of interest. If the field is time-varying, the adaptive navigation system of this invention can still achieve its control goals (under certain conditions), whereas conventional approaches cannot.

Navigation is performed by having the group of robots continuously estimate features of the field, such as the gradient of or differentials within the scalar field of interest. Based on these estimates, different adaptive navigation control primitives are used to drive the robot cluster to/along different features of interest. The primitives defined in this invention are the first-ever comprehensive collection of adaptive navigation capabilities allowing navigation to/along field maxima/minima, contour lines, ridges/trenches, and saddle points. This approach can save considerable time and energy in finding such locations, and it enables the potential to navigate such features even when the field is changing over time (for which conventional navigation approaches fail).

Furthermore, the application level controller of this invention selectively cycles between these primitive controllers to perform more complex capabilities, such as periodically finding local maxima within a field, comprehensively characterizing the distribution of a field, navigating while minimizing exposure or maintaining service levels, etc.

The elements of this invention include:
a) the original gradient-based navigation primitives for max/min and contour navigation (taught by the same inventors in U.S. patent application Ser. No. 14/749,944 filed Jun. 25, 2015, to which this application is a CIP, and which is incorporated herein by reference. U.S. patent application Ser. No. 14/749,944 filed Jun. 25, 2015 claims priority from U.S. Provisional Patent Application 62/016,845 filed Jun. 25, 2014, which is incorporated herein by reference).
b) a new set of differential control navigation primitives for ridge/trench and saddle point navigation, and
c) a control architecture to conduct missions through serial switching of primitives.

When operating, the robots are controlled to maintain a specific geometric shape and size (e.g., an equilateral triangle with 100-meter sides) based on the signals and scale of interest. While maintaining that geometry, they move through a field of interest with each robot making simultaneous measurements of the scalar field using their sensor packages. These measurements are shared to compute field characteristics such as the gradient and field differential measurements over specific sensing baselines. Given these characteristics, a set of primitive controllers are able to command the robot cluster to/along features of interest in the field.

The inventors have established—for the first time—a complete set of such primitives: extrema-finding, contour following, ridge/trench following, and saddle point positioning. Depending on the application of interest, the currently executing primitive is switched as certain conditions are met. This allows the robot cluster to perform tasks such as methodically searching a field for its set of local maxima (ascend first max, go down ridge and through saddle point, ascend to next max, etc.), mapping out the shape and extent of a scalar field (move to a max, descend to a contour and circumnavigate, descend to the next contour and circumnavigate, etc.), moving between points while minimizing exposure or ensuring a minimum service level, etc.

The presentation invention has demonstrated:

minima/maximum seeking experimentally, in the field;

contour following, both in simulation and experimentally, in the field;

ridge/trench following and saddle point positioning via simulation;

application capabilities through the sequencing of these primitives.

Features of the system include:

Multiple mobile robots are used to spatially sample the field, allowing an instantaneous computation of the gradient. Most other systems use a single mobile robot/vehicle to determine the gradient after a sequence of maneuvers.

The spatial distribution of the multiple robots is controlled in order to provide a high-quality estimate of the field's gradient. Furthermore, the spatial control technique of this invention controls all degrees-of-freedom of the system (unlike robotic swarm techniques) and supports arbitrary spatial and hierarchical definitions of robot geometry (unlike leader-follower techniques), which enhances the ability to control the spatial distribution of robots given variations in the scalar field. The inventors note the importance of being able to control the spatial/geometric attributes of the system since poor geometries can lead to poor estimates of the gradient, thereby dramatically affecting the performance of the system. The inventors also note that they were able to perform this capability with geometric parameters on the order of meters using GPS. The inventors also have computational techniques to overcome operation near geometric singularities, which otherwise would severely degrade performance.

The robots sense the scalar field using a sensor package; using different sensor packages allows the technique to be applied to completely different parameters of interest.

The robots communicate in real-time allowing instantaneous collaboration regarding gradient estimation and spatial control.

Sensor measurements are used to compute critical characteristics of the field such as the local gradient or the field differential across specific measurement baselines.

These characteristics are used by a variety of adaptive navigation primitive controllers, each supporting movement of the robot cluster to/along different features in the scalar field. The inventors believe to be the first to develop a comprehensive suite of such primitives allowing navigation with respect to all critical features of a field: maxima/minima, contour lines, ridges/trenches, and saddle points.

Application specific controllers are implemented within the application control architecture of this invention, switching between primitive controllers based upon sensed field characteristics. The inventors have demonstrated applications such as methodically moving from local max to local max within a field, mapping out the shape and extent of a scalar field, moving between points while minimizing exposure or ensuring a minimum service level, etc.

The technique of this invention allows the location of features of interest in temporally-varying fields, which is not viable for standard navigation techniques.

The inventors have implemented a system/technique to perform bathymetric characterization, which they believe is a newly conceived/implemented application for such capability.

The inventors have also implemented a system/technique to perform radio field (signal strength) characterization, which they believe is a newly implemented application for such capability.

The inventors have demonstrated techniques for both 2-D and 3D scalar fields.

The technique can be applied to any scalar parameter.

The technique can be implemented via land/sea/air/space systems, and the inventors have implemented it experimentally using marine and land systems and via simulation for aerial and space systems.

Variations increasing the number of robots used to measure the field and estimate the gradient or field differential; this can support higher quality estimation of the gradient/differential and can allow the system to tune itself to different fields that have different spatial and temporal frequencies and curvatures in the parameter of interest;

varying the size/shape of the robot formation geometry, similar to a sparse array antenna, to allow the system to tune into different spatial frequencies (e.g., it is possible to size the cluster to reduce spatial noise, to identify certain spatial features, etc.);

implementing the system with underwater robots, marine surface vessels, terrestrial surface robots, aerial robots, and spacecraft;

extending the techniques to support navigation through vector fields;

measuring other quantities of interest, which could include environmental state data (temperature, humidity, currents, radiation levels, etc.), chemical or biological concentration levels (oxygen, pollutants, turbidity, specific chemical compounds, specific biological activity, etc.), emission levels (finding best signal strength routes for wireless communication systems, etc.) and so on.

DETAILED DESCRIPTION

Figure 1:
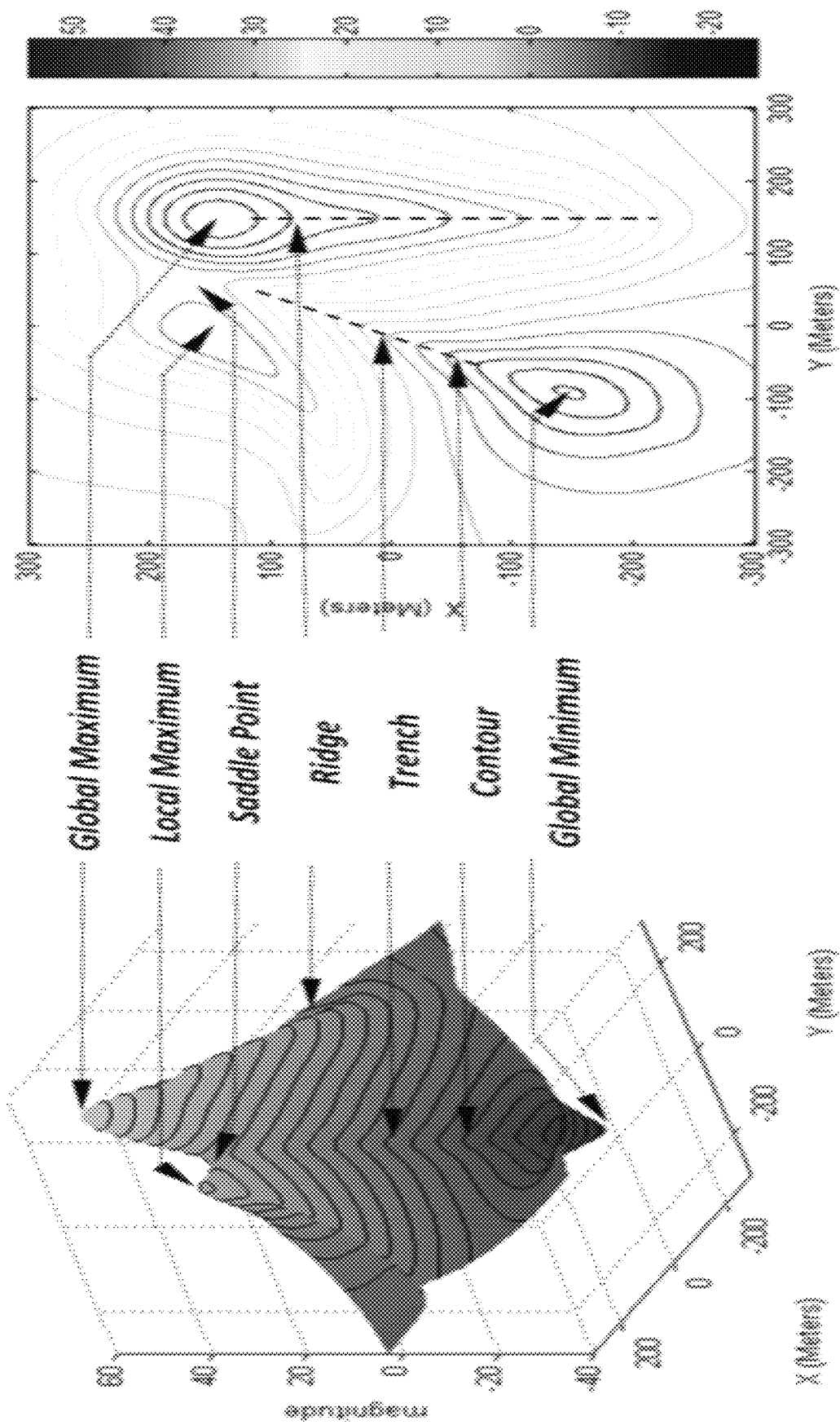
FIG. 1 shows according to an exemplary embodiment of the invention critical points within a scalar field: (left) 3D view of scalar surface, (right) overhead view of equivalent contour map.

Adaptive navigation is also useful when attempting to move to or along interesting points within a region, the exact spatial location(s) of which are unknown a priori and/or which may be moving. The most use of this capability is to locate the maximum or minimum point in a scalar field. Such a field associates a scalar value to every point in a space; for a planar region, the scalar value is often depicted as the altitude of a surface at the sampled point in a plane, as depicted in FIG. 1. Interesting features in a scalar field include the minimum and maximum values, contours of specific value, ridges and trenches within the field, and saddle points. Scalar fields are often used to represent environmental factors such as temperature, light level, barometric pressure, or concentrations of specific entities. In such fields, extreme points might represent the location of important features such as a heat or pollution source or perhaps the center of an anoxic region. Contours define the location of specific values or concentrations and are important in defining the extent of a field, specifying safety thresholds, etc. Ridges (trenches) define maximum (minimum) signal paths to critical points in a field; they also serve as divides (accumulators) for other processes that flow with respect to gradients (e.g., water flows away from ridges and gathers in streams, etc.). Finally, saddle points serve as minimum energy gateways adjoining maxima (minima) (e.g., travelers in mountainous regions move through saddle point "passes" in mountainous regions when journeying between adjoining peaks or valleys). Altogether, these features are the critical elements of a scalar field; all are of interest for a wide range of applications, and being able to navigate to/along all of these provides a robust set of primitive capabilities for an adaptive navigation system.

Figure 2:
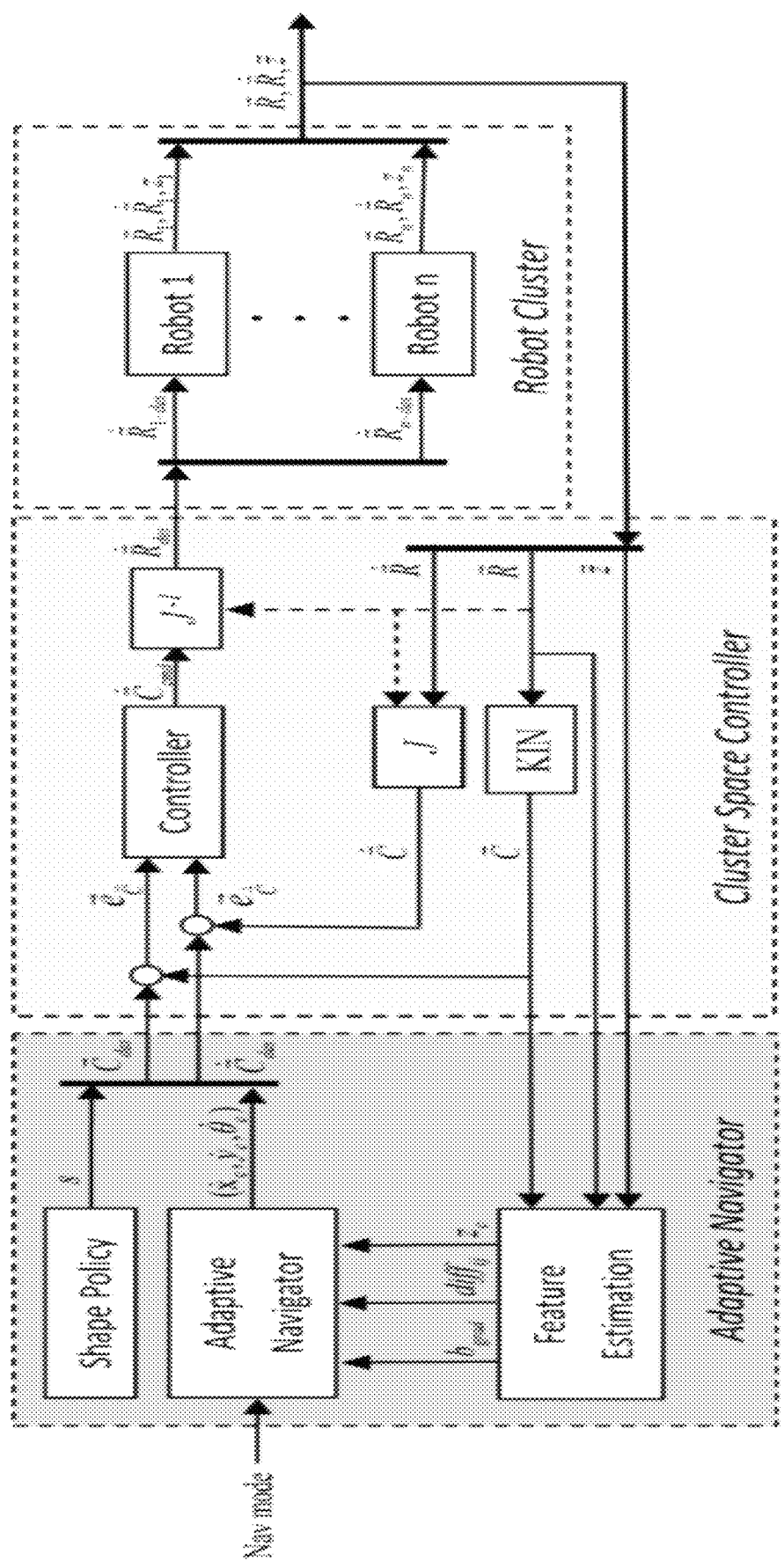
FIG. 2 shows according to an exemplary embodiment of the invention the adaptive navigation layered control architecture: In the lowest layer (right), individual robots execute closed loop velocity commands. A formation control layer (middle) issues robot-level velocity setpoints in order to maintain a specified cluster geometry and to drive the cluster as commanded. Finally, an adaptive navigation layer (left) provides appropriate cluster geometric setpoints and provides cluster drive commands based on measurements of the scalar field and the selected navigation mode.

Central to the adaptive navigation technique of this invention is the ability to sense, compute, and move with respect to spatial characteristics of a scalar field. This is performed with a minimal number of robots, each with the ability to sample the field and share information. Motion of the robots is specified by a formation controller that maintains relative position to ensure the collection of scalar field data in all spatial dimensions and at an appropriate spatial resolution. At a higher level, the adaptive navigator ingests realtime scalar field samples from the robots, computes relevant spatial characteristics (such as the gradient or differential offsets), and determines appropriate motion commands for the multirobot formation using a reactive control policy. This layered control approach is shown in FIG. 2.

Other embodiments, further teachings and/or examples related to the invention are described in U.S. Provisional Patent Application 62/485,802 filed Apr. 14, 2017, which is incorporated herein by reference, as well as in U.S. patent application Ser. No. 14/749,944 filed Jun. 25, 2015, which is incorporated herein by reference, as well as in U.S. Provisional Patent Application 62/016,845 filed Jun. 25, 2014, which is incorporated herein by reference.

What is claimed is:

1. A system for navigation of mobile robots, comprising:
    (a) a cluster of spatially-distributed mobile robots each robot equipped with sensors, the robots navigating in a space with a desired navigation task;
    (b) a robot formation spatial control system to ensure spatial distribution of synchronized sensor measurements among the cluster of spatially-distributed mobile robots;
    (c) a primitive adaptive navigation controller to allow the cluster of spatially-distributed mobile robots to efficiently navigate to/along locations of interest within a scalar parameter field; and
    (d) a state-based application-specific sequencer to invoke different adaptive navigation primitives to perform a navigation application by the mobile robots, wherein the different adaptive navigation primitives are defined as extrema-finding, contour following, ridge/trench following, saddle point positioning or a combination thereof.

* * * * *